(12) United States Patent
Wang et al.

(10) Patent No.: US 7,791,685 B2
(45) Date of Patent: Sep. 7, 2010

(54) LIQUID CRYSTAL DISPLAY HAVING PARTICULAR RELATIONSHIP BETWEEN COLOR FILTER LAYER AND BACKLIGHT MODULE

(75) Inventors: Chun-Chieh Wang, Hsinchu (TW); Yu-Hui Chou, Hsinchu (TW); Chen-Hsien Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 361 days.

(21) Appl. No.: 12/043,973

(22) Filed: Mar. 7, 2008

(65) Prior Publication Data

US 2009/0135338 A1 May 28, 2009

(30) Foreign Application Priority Data

Nov. 22, 2007 (TW) ............... 96144302 A

(51) Int. Cl.
*G02F 1/1335* (2006.01)
(52) U.S. Cl. ............... 349/69; 349/106; 349/61; 349/62
(58) Field of Classification Search ............ 349/69, 349/106, 61, 62
See application file for complete search history.

(56) References Cited

U.S. PATENT DOCUMENTS

| | | | | |
|---|---|---|---|---|
| 4,772,885 A | * | 9/1988 | Uehara et al. | 349/71 |
| 5,737,040 A | * | 4/1998 | Ichikawa et al. | 349/9 |
| 6,050,704 A | * | 4/2000 | Park | 362/260 |
| 7,126,274 B2 | | 10/2006 | Shimizu et al. | |
| 7,486,354 B2 | * | 2/2009 | Chang et al. | 349/106 |
| 2006/0227260 A1 | | 10/2006 | Haga et al. | |

* cited by examiner

*Primary Examiner*—Mike Qi
(74) *Attorney, Agent, or Firm*—Jianq Chyun IP Office

(57) ABSTRACT

An liquid crystal display including a backlight module and an LCD panel is disclosed. The backlight module has a white light source, and the normalized optical spectrum of the backlight module is $BL(\lambda)$. The LCD panel includes a red color filter layer, a green color filter layer and a blue color filter layer. The green color filter layer and the backlight module are subject to the following relationship: $E=C/D$ and $E \geq 0.8$, wherein A is defined as the wavelength corresponding to the maximum peak value of $CF_{Green}(\lambda) \times BL(\lambda) \times x(\lambda)$; B is defined as the wavelength corresponding to the maximum peak value of $CF_{Green}(\lambda) \times BL(\lambda) \times y(\lambda)$; C is defined as the integral on $CF_{Green}(\lambda) \times BL(\lambda) \times x(\lambda)$ over the interval between A and B; D is defined as the integral on $CF_{Green}(\lambda) \times BL(\lambda) \times y(\lambda)$ over the interval larger than B, $CF_{Green}(\lambda)$ is the transmission spectrum of the green color filter layer; and $x(\lambda)$ and $y(\lambda)$ are color matching functions.

19 Claims, 7 Drawing Sheets

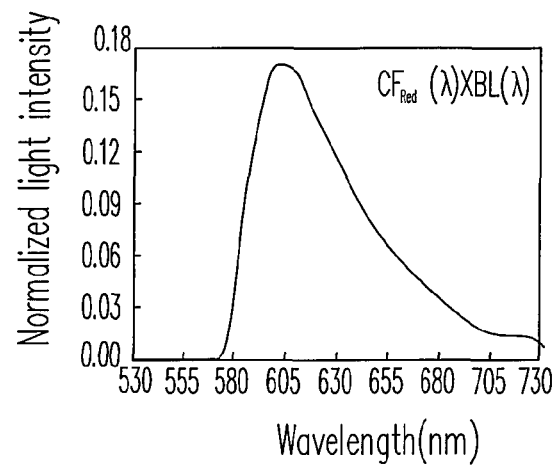
FIG. 5A
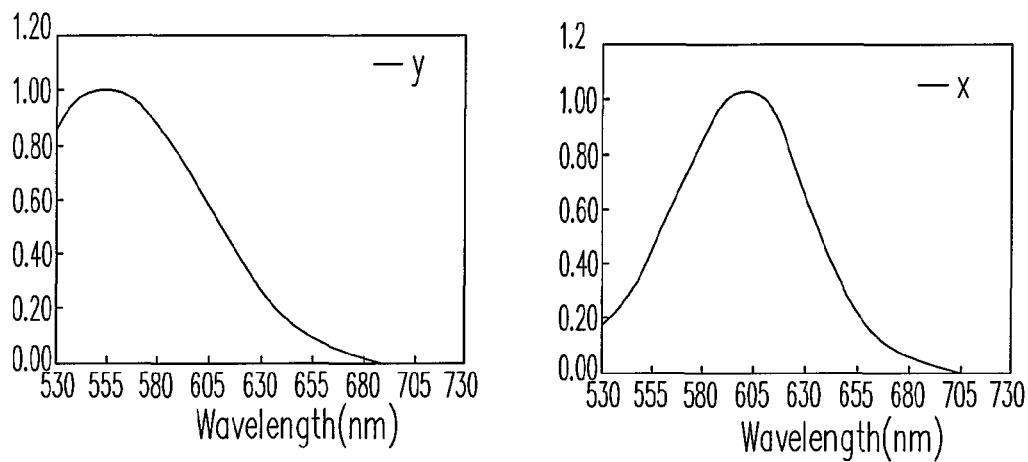
FIG. 5B
FIG. 5C
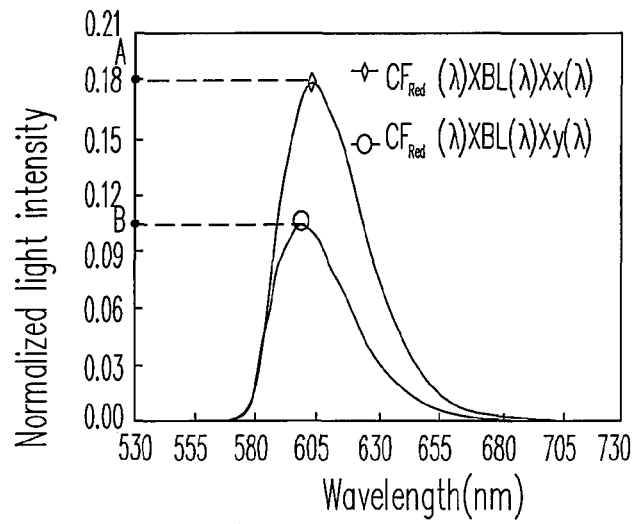
FIG. 5D

US 7,791,685 B2

LIQUID CRYSTAL DISPLAY HAVING PARTICULAR RELATIONSHIP BETWEEN COLOR FILTER LAYER AND BACKLIGHT MODULE

CROSS-REFERENCE TO RELATED APPLICATION

This application claims the priority benefit of Taiwan application serial no. 96144302, filed on Nov. 22, 2007. The entirety the above-mentioned patent application is hereby incorporated by reference herein and made a part of specification.

BACKGROUND OF THE INVENTION

1. Field of the Invention

The present invention generally relates to a liquid crystal display (LCD), and more particularly, to an LCD having good color reproducibility.

2. Description of Related Art

Since an LCD has advantages, such as small size, high display quality, low power consumption and no radiation, the LCD has played a major role in the mainstream display market overwhelming the traditional cathode ray tube (CRT) display. However, in comparison with the CRT display, an LCD requires a backlight source to display images. The common backlight source of an LCD includes cold-cathode fluorescent lamp (CCFL), clod-cathode flat fluorescent lamp (CCFFL) or light-emitting diodes (LEDs).

A white LED has advantages, such as low heat dissipation, power-saving, long lifetime, fast response speed, small size and surface mount feasibility; therefore, the white LED has been viewed as 'a white lighting revolution'. In the market of various applications, the white LED has been gradually applied to a backlight module of a handheld display or a portable display due to the advantages of power-saving, small size and fast response speed. However, a common white LED is usually implemented by using a blue LED chip in association with an YAG (yttrium aluminum garnet) phosphor because the white LED including the blue LED chip and YAG phosphor has the advantages of packaging convenience and small size, but the color saturation of the white LED is still not good enough. In particular, in contrast with a CCFL backlight module, the backlight module having white LEDs more likely brings a color-shift phenomenon, for example, an orange-shift problem usually occurs with an LCD.

FIG. 1A is a green chromaticity coordinate diagram of a conventional LCD. Referring to FIG. 1A, the green chromaticity coordinate points of a conventional LCD during displaying green color mostly fall out of a region 10 in FIG. 1A, which causes a yellow-shift greenish color to be displayed. In other words, in order to normally display green color by an LCD, the green chromaticity coordinate points must fall within the region 10 of FIG. 1A. However, limited by the nature of white LEDs (having an architecture of a blue LED chip in association with YAG phosphor), a color-shift phenomenon usually occurs in a conventional LED during displaying green color.

FIG. 1B is a color space chromaticity coordinate diagram according to CIE 1931 chromaticity coordinate diagram. Referring to FIG. 1B, the red chromaticity coordinate points of a conventional LED mostly fall within a region 11 in FIG. 1B, which causes an orange-shift redish color to be displayed during displaying red color. Similarly, limited by the nature of white LEDs (having an architecture of a blue LED chip in association with YAG phosphor), a color-shift phenomenon usually occurs in a conventional LED during displaying red color.

It can be seen from the prior art that when an LCD employing a backlight module of white LEDs is displaying color images, the green color and the red color are displayed with color-shift, which degrades the color saturation of the LCD.

SUMMARY OF THE INVENTION

Accordingly, the present invention is directed to an LCD capable of providing good green color reproducibility.

The present invention is also directed to an LCD having good color saturation.

The present invention is further directed to an LCD capable of providing good red color reproducibility.

The present invention provides an LCD, which includes a backlight module and an LCD panel, wherein the backlight module has at least a white light source, and the normalized optical spectrum of the backlight module is $BL(\lambda)$. In addition, the LCD panel is disposed over the backlight module. The LCD panel includes two substrates and a liquid crystal layer located between the two substrates, wherein one of the two substrates has a red color filter layer, a green color filter layer and a blue color filter layer, and the green color filter layer and the backlight module are subject to the following relationship:

$$E = C/D \text{ and } E \geq 0.8,$$

wherein A is defined as the wavelength corresponding to the maximum peak value of $CF_{Green}(\lambda) \times BL(\lambda) \times x(\lambda)$; B is defined as the wavelength corresponding to the maximum peak value of $CF_{Green}(\lambda) \times BL(\lambda) \times y(\lambda)$; C is defined as the integral on $CF_{Green}(\lambda) \times BL(\lambda) \times x(\lambda)$ over the interval between A and B; D is defined as the integral on $CF_{Green}(\lambda) \times BL(\lambda) \times y(\lambda)$ over the interval larger than B, $CF_{Green}(\lambda)$ is the transmission spectrum of the green color filter layer, and $x(\lambda)$ and $y(\lambda)$ are color matching functions.

The present invention also provides an LCD, which includes: a backlight module and an LCD panel, wherein the backlight module has at least a white light source, and the normalized optical spectrum of the backlight module is $BL(\lambda)$. In addition, the LCD panel is disposed over the backlight module. The LCD panel includes two substrates and a liquid crystal layer located between the two substrates, wherein one of the two substrates has a red color filter layer, a color filter layer and a blue color filter layer, and the color filter layer includes at least one of a green color filter layer, a cyan color filter layer and a yellow color filter layer, and the color filter layer and the backlight module are subject to the following relationship:

$$E' = C/D \text{ and } E' \geq 0.8,$$

wherein A is defined as the wavelength corresponding to the maximum peak value of $CF_X(\lambda) \times BL(\lambda) \times x(\lambda)$; B is defined as the wavelength corresponding to the maximum peak value of $CF_X(\lambda) \times BL(\lambda) \times y(\lambda)$; C is defined as the integral on $CF_X(\lambda) \times BL(\lambda) \times x(\lambda)$ over the interval between A and B; D is defined as the integral on $CF_X(\lambda) \times BL(\lambda) \times y(\lambda)$ over the interval larger than B, $CF_X(\lambda)$ is the transmission spectrum of the green color filter layer, and $x(\lambda)$ and $y(\lambda)$ are color matching functions.

In an embodiment of the above-mentioned LCD, the areas proportion of the green color filter layer, the cyan color filter layer and the yellow color filter layer is a:b:c, and the effective transmission spectrum of the above-mentioned color filter layer is defined as:

$$CF_X(\lambda) = \frac{a \times CF_{Green}(\lambda) + b \times CF_{Cyan}(\lambda) + c \times CF_{Yellow}(\lambda)}{a+b+c}$$

wherein $CF_{Green}(\lambda)$ is the transmission spectrum of the green color filter layer, $CF_{Cyan}(\lambda)$ is the transmission spectrum of the cyan color filter layer and $CF_{yellow}(\lambda)$ is the transmission spectrum of the yellow color filter layer, and a, b and c are greater than or equal to zero, but a, b and c are not simultaneously zero.

The present invention further provides an LCD, which includes: a backlight module and an LCD panel, wherein the backlight module has at least a white light source, and the normalized optical spectrum of the backlight module is $BL(\lambda)$. In addition, the LCD panel is disposed over the backlight module. The LCD panel includes two substrates and a liquid crystal layer located between the two substrates, wherein one of the two substrates has a red color filter layer, a green filter layer and a blue color filter layer, and the red color filter layer and the backlight module are subject to the following relationship:

$$A/B \geq 1.76,$$

wherein A is defined as the maximum light intensity value of $CF_{Red}(\lambda) \times BL(\lambda) \times x(\lambda)$ between two wavelengths of 525 nm and 625 nm; B is defined as the maximum light intensity value of $CF_{Red}(\lambda) \times BL(\lambda) \times y(\lambda)$ between two wavelengths of 525 nm and 625 nm; $CF_{Red}(\lambda)$ is the transmission spectrum of the red color filter layer, and $x(\lambda)$ and $y(\lambda)$ are color matching functions.

In an embodiment of the above-mentioned LCD, the above-mentioned backlight module includes a direct-type backlight module or an edge-type backlight module.

In an embodiment of the above-mentioned LCD, the above-mentioned white light source includes a white LED.

In an embodiment of the above-mentioned LCD, the above-mentioned substrates include a TFT (thin film transistor) array substrate and a color filter substrate.

In an embodiment of the above-mentioned LCD, the above-mentioned substrates include a COA (color filter on array) substrate and an alignment substrate with a common electrode.

In an embodiment of the above-mentioned LCD, above-mentioned substrates include an AOC (array on color filter) substrate and an alignment substrate with a common electrode.

In summary, the present invention multiplies the optical spectrum of a filter layer by the transmission spectrum of the backlight module, then multiplies the product by a color matching function and the final product must be subject to a specific relationship, so as to improve the color-shift of the LCD. In this way, the LCD of the present invention has good color saturation and good color reproducibility.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a graph showing a product of a normalized optical spectrum $BL(\lambda)$ and a transmission spectrum $CF_{Red}(\lambda)$ of a red color filter layer.

FIGS. 5B and 5C are graphs respectively showing a color matching function $x(\lambda)$ and a color matching function $y(\lambda)$.

FIG. 5D is a graph for comparing a normalized light intensity distribution $CF_{Red}(\lambda) \times BL(\lambda) \times x(\lambda)$ with a normalized light intensity distribution $CF_{Red}(\lambda) \times BL(\lambda) \times y(\lambda)$.

DESCRIPTION OF THE EMBODIMENTS

Figure 1A:
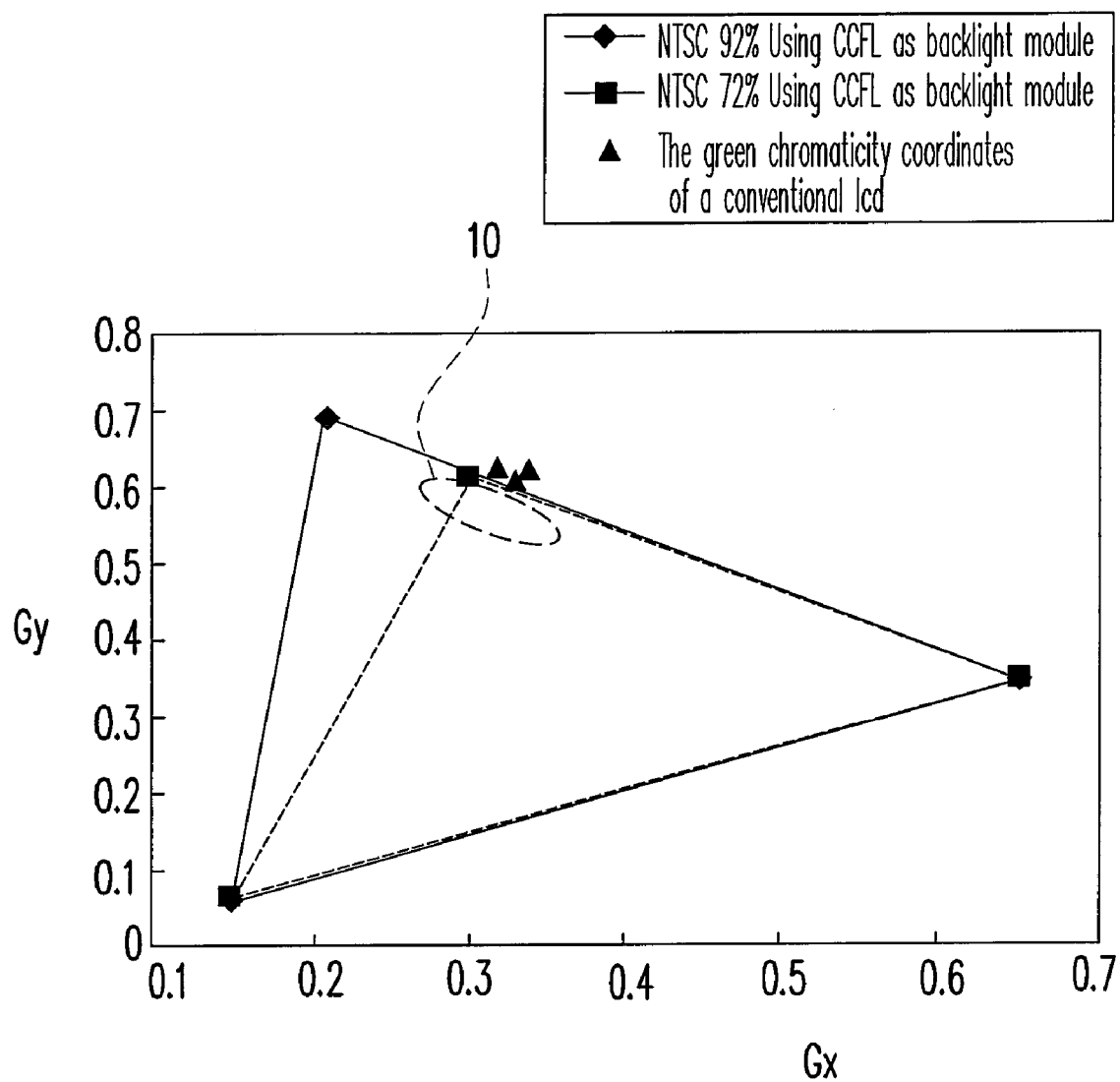
FIG. 1A is a green chromaticity coordinate diagram of a conventional LCD.
Figure 1B:
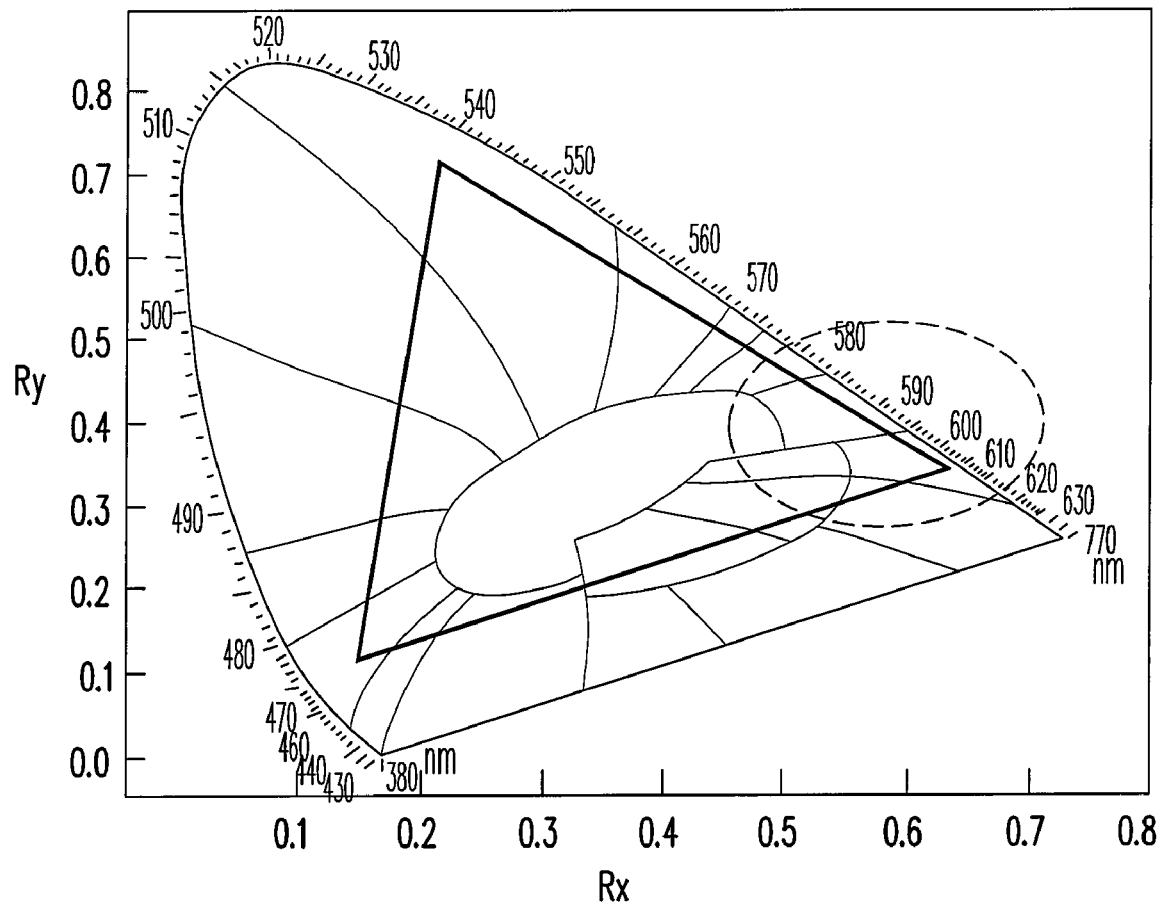
FIG. 1B is a color space chromaticity coordinate diagram according to CIE 1931 chromaticity coordinate diagram.
Figure 1B:
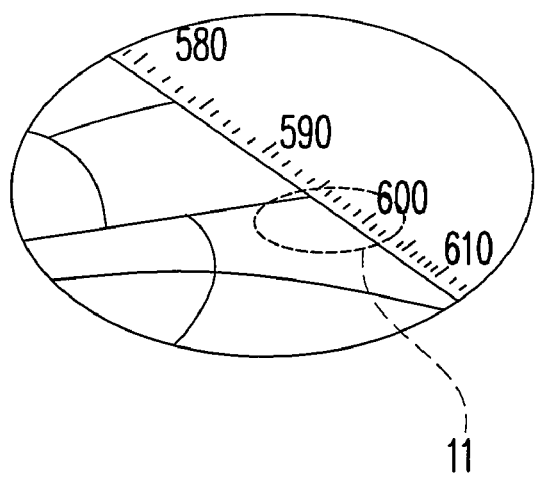

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2A:
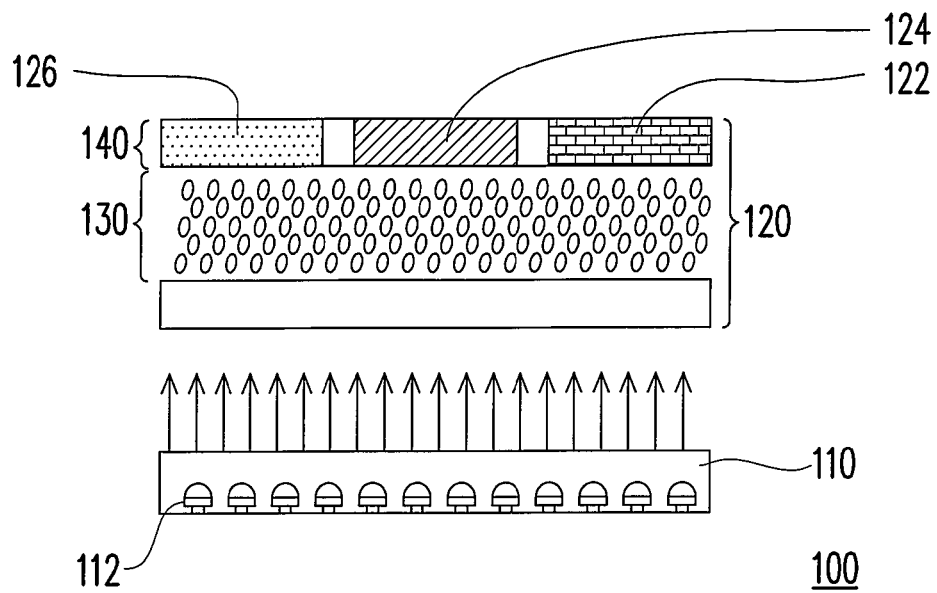
FIG. 2A is a locally-large cross-section diagram of an LCD according to the present invention.

FIG. 2A is a locally-large cross-section diagram of an LCD according to the present invention. Referring to FIG. 2A, an LCD 100 of the embodiment includes a backlight module 110 and an LCD panel 120, wherein the backlight module 110 has at least a white light source 112, and the normalized optical spectrum of the backlight module 110 is $BL(\lambda)$. The LCD panel 120 is disposed over the backlight module 110. The LCD panel 120 includes two substrates and a liquid crystal layer 130 located between the two substrates, wherein one of the two substrates has a red color filter layer 122, a green color filter layer 124 and a blue color filter layer 126. The present invention does not limit the type of the white LED. In fact, the white LED can be a white LED composed of a blue LED and YAG, a white LED composed of a plurality of LEDs able to emit different color light or a white LED of other types.

In the embodiment, the normalized optical spectrum of the backlight module 110 is $BL(\lambda)$, the transmission spectrum of the green color filter layer 124 is $CF_{Green}(\lambda)$, and by respectively multiplying the product of the normalized optical spectrum $BL(\lambda)$ of the backlight module 110 and the transmission spectrum $CF_{Green}(\lambda)$ of the green color filter layer 124 by the color matching functions $x(\lambda)$ and $y(\lambda)$, two normalized light intensity distributions $CF_{Green}(\lambda) \times BL(\lambda) \times x(\lambda)$ and $CF_{Green}(\lambda) \times BL(\lambda) \times y(\lambda)$ are obtained.

Figure 2B:
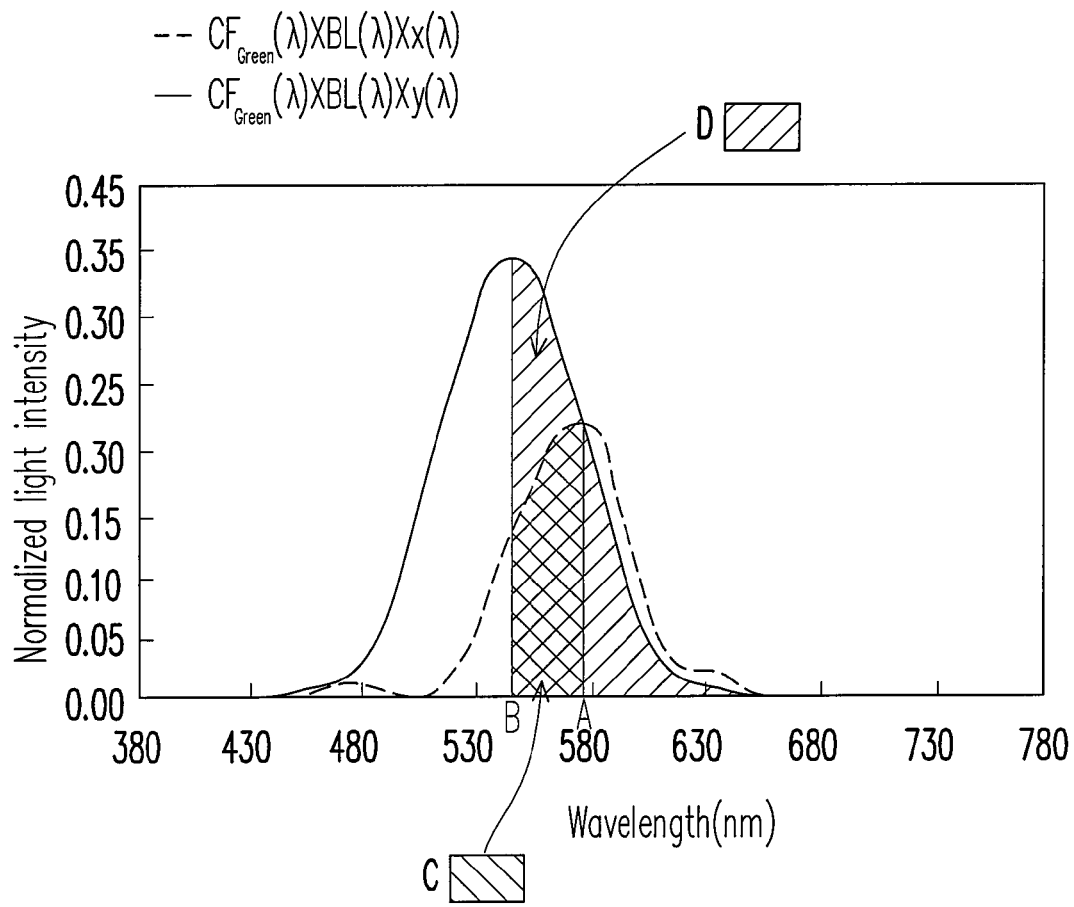
FIG. 2B is a diagram showing a normalized light intensity distribution $CF_{Green}(\lambda) \times BL(\lambda) \times x(\lambda)$ and a normalized light intensity distribution $CF_{Green}(\lambda) \times BL(\lambda) \times y(\lambda)$.

FIG. 2B is a diagram showing a normalized light intensity distribution $CF_{Green}(\lambda) \times BL(\lambda) \times x(\lambda)$ and a normalized light intensity distribution $CF_{Green}(\lambda) \times BL(\lambda) \times y(\lambda)$. Referring to FIG. 2B, the wavelength corresponding to the maximum peak value of the normalized light intensity distribution $CF_{Green}(\lambda) \times BL(\lambda) \times x(\lambda)$ is defined as A; the wavelength corresponding to the maximum peak value of the normalized light intensity distribution $CF_{Green}(\lambda) \times BL(\lambda) \times y(\lambda)$ is defined as B; by conducting integral on the normalized light intensity distribution $CF_{Green}(\lambda) \times BL(\lambda) \times x(\lambda)$ over the interval between the wavelength A and the wavelength B, an integral value C is obtained; similarly, by conducting integral on another normalized light intensity distribution $CF_{Green}(\lambda) \times BL(\lambda) \times y(\lambda)$ over the interval from the wavelength B to infinity, an integral value D is obtained. In addition, an equation is defined as: E=C/D with demanding E≧0.8. The values of C, D and E are varied with different normalized optical spectrum $BL(\lambda)$ and different transmission spectrum $CF_{Green}(\lambda)$. Therefore, the embodiment can improve the color-shift of the conventional LCD during displaying green images by adjusting the transmission spectrum $CF_{Green}(\lambda)$ of the green color filter layer 124 or the normalized optical spectrum $BL(\lambda)$ of the backlight module 110 to meet the condition of E≧0.8.

Different values of A, B, C, D and E are corresponding to different chroma coordinates (Gx, Gy) and different transmission spectrums $CF_{Green}(\lambda)$ produce different values of A, B, C and D. The embodiment lists several chroma coordinates (Gx, Gy) and the corresponding values A, B, C, D and E in Table 1.

Figure 2C:
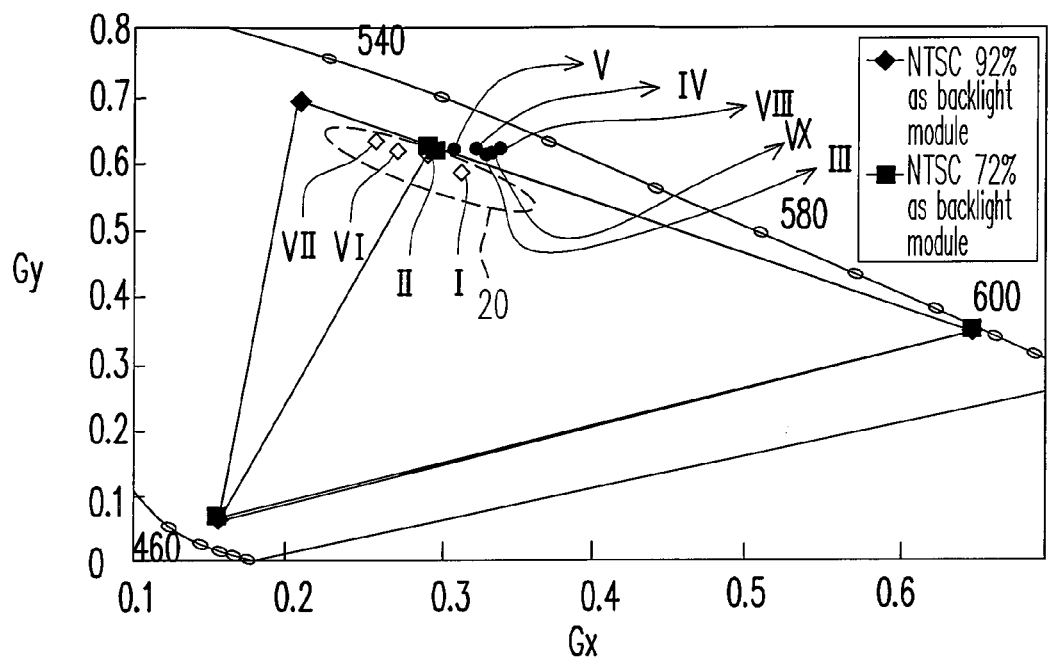
FIG. 2C is a chromaticity coordinate diagram wherein nine chroma coordinate points I-VX corresponding to Table 1 are marked.

FIG. 2C is a chromaticity coordinate diagram wherein nine chroma coordinate points I-VX corresponding to Table 1 are marked. Referring to FIG. 2C and Table 1, when E≧0.8, the corresponding chroma coordinates (Gx, Gy) fall in an area 20, as shown by I, II, VI and VII. In contrast, when E<0.8, the corresponding chroma coordinates (Gx, Gy) fall out of the area 20 and the displayed green images by the LCD have color-shif, as shown by III, IV, V, VIII and IX. The values listed in Table 1 are intended for describing, but do not limit, the present invention.

TABLE 1

|  | (Gx, Gy) | A(nm) | B(nm) | C | D | E |  |
|---|---|---|---|---|---|---|---|
| I | (0.314, 0.578) | 576 | 546 | 9.34 | 11.60 | 0.805 | OK |
| II | (0.294, 0.606) | 571 | 543 | 8.39 | 9.40 | 0.893 | OK |
| III | (0.334, 0.602) | 570 | 553 | 4.15 | 6.55 | 0.634 | X |
| IV | (0.326, 0.614) | 569 | 551 | 4.17 | 5.94 | 0.702 | X |
| V | (0.310, 0.610) | 571 | 554 | 3.85 | 6.10 | 0.631 | X |
| VI | (0.273, 0.612) | 559 | 536 | 6.38 | 7.20 | 0.886 | OK |
| VII | (0.260, 0.627) | 559 | 536 | 6.13 | 6.42 | 0.954 | OK |
| VIII | (0.343, 0.613) | 572 | 547 | 8.30 | 10.87 | 0.764 | X |
| IX | (0.336, 0.606) | 576 | 550 | 7.41 | 9.38 | 0.790 | X |

The Second Embodiment

Figure 3A:
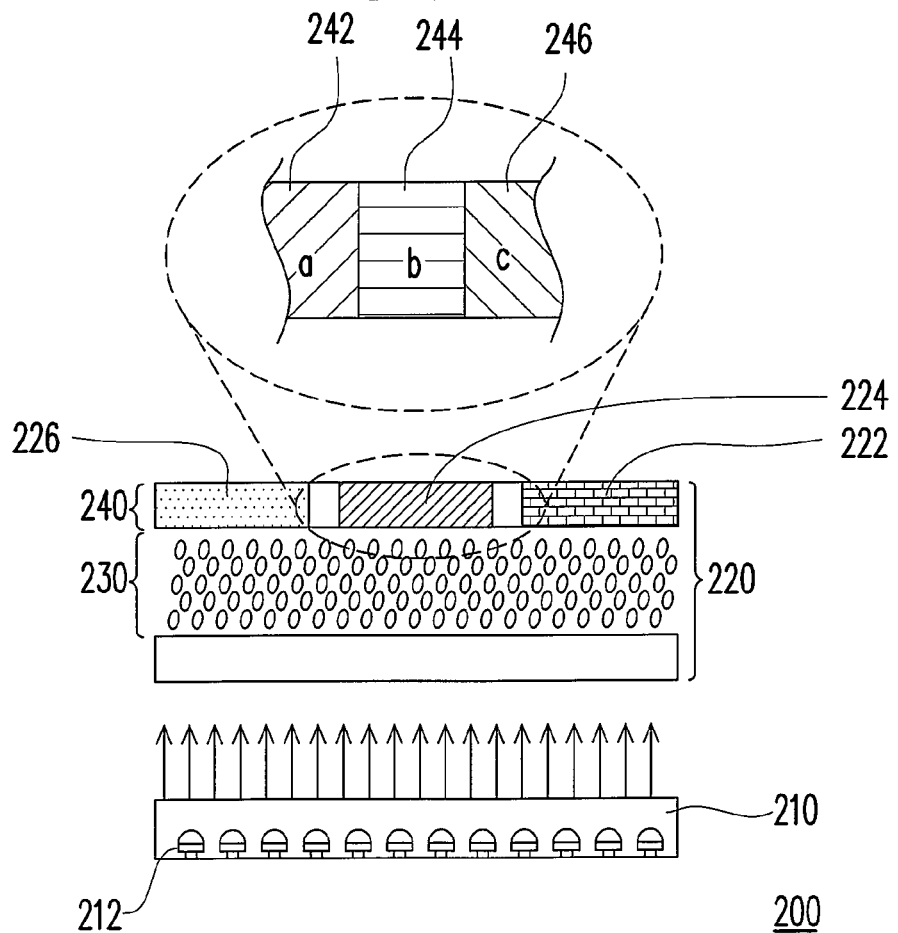
FIG. 3A is a locally-large cross-section diagram of an LCD according to the present invention.

FIG. 3A is a locally-large cross-section diagram of an LCD according to the present invention. The LCD 200 of the embodiment is similar to the LCD 100, except that the middle color filter layer of the LCD 200 includes at least one of a green color filter layer 242, a cyan color filter layer 244 and a yellow color filter layer 246, while other two color filter layers 222 and 226 are the same as 122 and 126 in FIG. 2A.

Figure 3B:
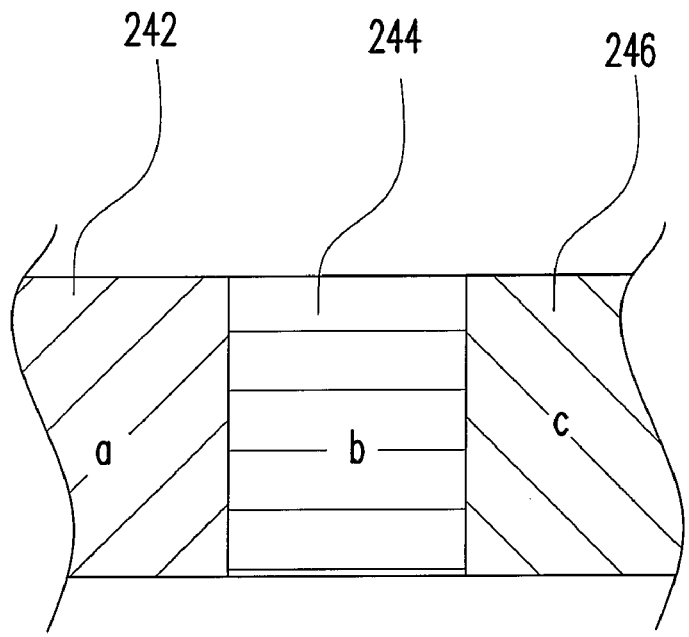
FIG. 3B is a locally top view of the color filter layer of FIG. 3A.

FIG. 3B is a locally top view of the color filter layer 224 of FIG. 3A. Referring to FIG. 3B, the areas proportion of the green color filter layer 242, the cyan color filter layer 244 and the yellow color filter layer 246 is a:b:c. Since the color filter layer 224 includes three color filter layers with different colors and different transmittance, thus the effective transmission spectrum of the color filter layer 224 is defined by $CF_X(\lambda)$, wherein the effective transmission spectrum of the green color filter layer 242 is defined by $CF_{Green}(\lambda)$, the effective transmission spectrum of the cyan color filter layer 244 is defined by $CF_{Cyan}(\lambda)$ and the effective transmission spectrum of the yellow color filter layer 246 is defined by $CF_{Yellow}(\lambda)$. The color filter layer 224 is composed of the above-mentioned green color filter layer 242, the cyan color filter layer 244 and the yellow color filter layer 246, therefore, the effective transmission spectrum $CF_X(\lambda)$ of the color filter layer 224 is defined by:

$$CF_X(\lambda) = \frac{a \times CF_{Green}(\lambda) + b \times CF_{Cyan}(\lambda) + c \times CF_{Yellow}(\lambda)}{a+b+c}$$

wherein the proportion of a:b:c is greater than or equal to zero, and the values of a, b and c are not simultaneously zero.

In the embodiment, the normalized optical spectrum of the backlight module 210 is $BL(\lambda)$, the effective transmission spectrum of the color filter layer 224 is $CF_X(\lambda)$, and by respectively multiplying the product of the normalized optical spectrum $BL(\lambda)$ of the backlight module 210 and the transmission spectrum $CF_X(\lambda)$ of the green color filter layer 224 by the color matching functions $x(\lambda)$ and $y(\lambda)$, two normalized light intensity distributions $CF_X(\lambda) \times BL(\lambda) \times x(\lambda)$ and $CF_X(\lambda) \times BL(\lambda) \times y(\lambda)$ are obtained.

Similarly to the definitions of the first embodiment, the wavelength corresponding to the maximum peak value of the normalized light intensity distribution $CF_X(\lambda) \times BL(\lambda) \times x(\lambda)$ is defined as A; the wavelength corresponding to the maximum peak value of the normalized fight intensity distribution $CF_X(\lambda) \times BL(\lambda) \times y(\lambda)$ is defined as B; by conducting integral on the normalized light intensity distribution $CF_X(\lambda) \times BL(\lambda) \times x(\lambda)$ over the interval between the wavelength A and the wavelength B, an integral value C is obtained; similarly, by conducting integral on another normalized light intensity distribution $CF_X(\lambda) \times BL(\lambda) \times y(\lambda)$ over the interval from the wavelength B to infinity, an integral value D is obtained.

In addition, an equation is defined as: E'=C/D with demanding E'≧0.8. The values of C, D and E' are varied with different normalized optical spectrum $BL(\lambda)$ and different transmission spectrum $CF_X(\lambda)$. Therefore, the embodiment can improve the color-shift of the conventional LCD during displaying green images by adjusting the transmission spectrum $CF_X(\lambda)$ of the color filter layer 224 or the normalized optical spectrum $BL(\lambda)$ of the backlight module 210 to meet the condition of E'≧0.8.

The Third Embodiment

Figure 4:
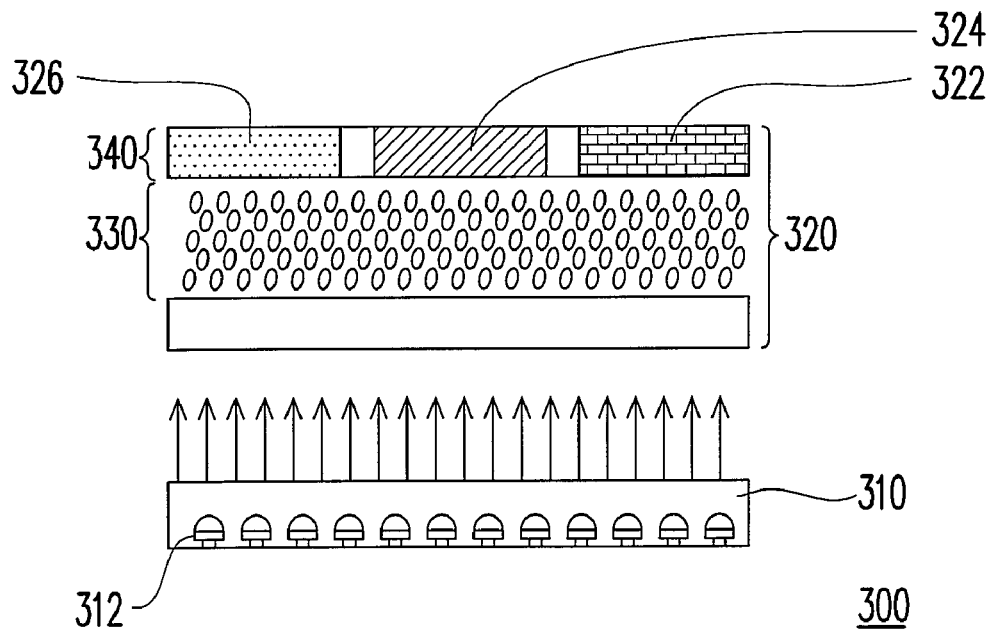
FIG. 4 is a locally-large cross-section diagram of an LCD according to the present invention.

FIG. 4 is a locally-large cross-section diagram of an LCD according to the present invention. Referring to FIG. 4, an LCD 300 of the embodiment includes a backlight module 310 and an LCD panel 320, wherein the backlight module 310 has at least a white light source 112 disposed thereon, the white light source 312 is, for example, a white LED or a white organic LED and the normalized optical spectrum of the backlight module 310 is $BL(\lambda)$. The LCD panel 320 is disposed over the backlight module 310. The LCD panel 320 includes two substrates and a liquid crystal layer 330 located between the two substrates, wherein one of the two substrates has a red color filter layer 324, a green color filter layer 322 and a blue color filter layer 326. Similarly to the first embodiment, the present invention does not limit the type of the white LED.

FIGS. 5A-5D are the flowchart for converting the optical spectrums in the embodiment. FIG. 5A is a graph showing a product of a normalized optical spectrum $BL(\lambda)$ of the backlight module 310 in FIG. 5A and a transmission spectrum $CF_{Red}(\lambda)$ of a red color filter layer 324. FIGS. 5B and 5C are graphs respectively showing a color matching function $x(\lambda)$ and a color matching function. $y(\lambda)$. FIG. 5D is a graph for comparing a normalized light intensity distribution $CF_{Red}(\lambda) \times BL(\lambda) \times x(\lambda)$ with a normalized light intensity distribution. $CF_{Red}(\lambda) \times BL(\lambda) \times y(\lambda)$. Referring to FIGS. 5A-5D, the normalized optical spectrum of the backlight module 310 is $BL(\lambda)$, the transmission spectrum of the red color filter layer 324 is $CF_{Red}(\lambda)$, and by respectively multiplying the product of the normalized optical spectrum $BL(\lambda)$ of the backlight module 310 and the transmission spectrum $CF_{Red}(\lambda)$ of the red color filter layer 324 by the color matching functions $x(\lambda)$ and $y(\lambda)$, two normalized light intensity distributions $CF_{Green}(\lambda) \times BL(\lambda) \times x(\lambda)$ and $CF_{Green}(\lambda) \times BL(\lambda) \times y(\lambda)$ are obtained. The maximum peak value of the normalized light intensity distribution $CF_{Red}(\lambda) \times BL(\lambda) \times x(\lambda)$ between the wavelengths 525 nm and 625 nm is defined as A; the maximum peak value of the normalized light intensity distribution $CF_{Red}(\lambda) \times BL(\lambda) \times y(\lambda)$ between the wavelengths 525 nm and 625 nm is defined as B. In addition, an equation is defined as: $A/B \geq 1.76$. The different transmission spectrums $CF_{Red}(\lambda)$ produce different values A and B. Therefore, the embodiment can improve the color-shift of the conventional LCD during displaying red images by adjusting the transmission spectrum $CF_{Red}(\lambda)$ of the red color filter layer 324 or the normalized optical spectrum $BL(\lambda)$ of the backlight module 310 to meet the condition of $A/B \geq 1.76$.

Different transmission spectrums $CF_{Red}(\lambda)$ produce different values of A, B. The embodiment lists several chroma coordinates (Rx, Ry) and the corresponding values A and B according to the above-mentioned definitions and the equation in Table 2, and FIG. 6 is a diagram showing six different coordinate points of Table 2.

Figure 6:
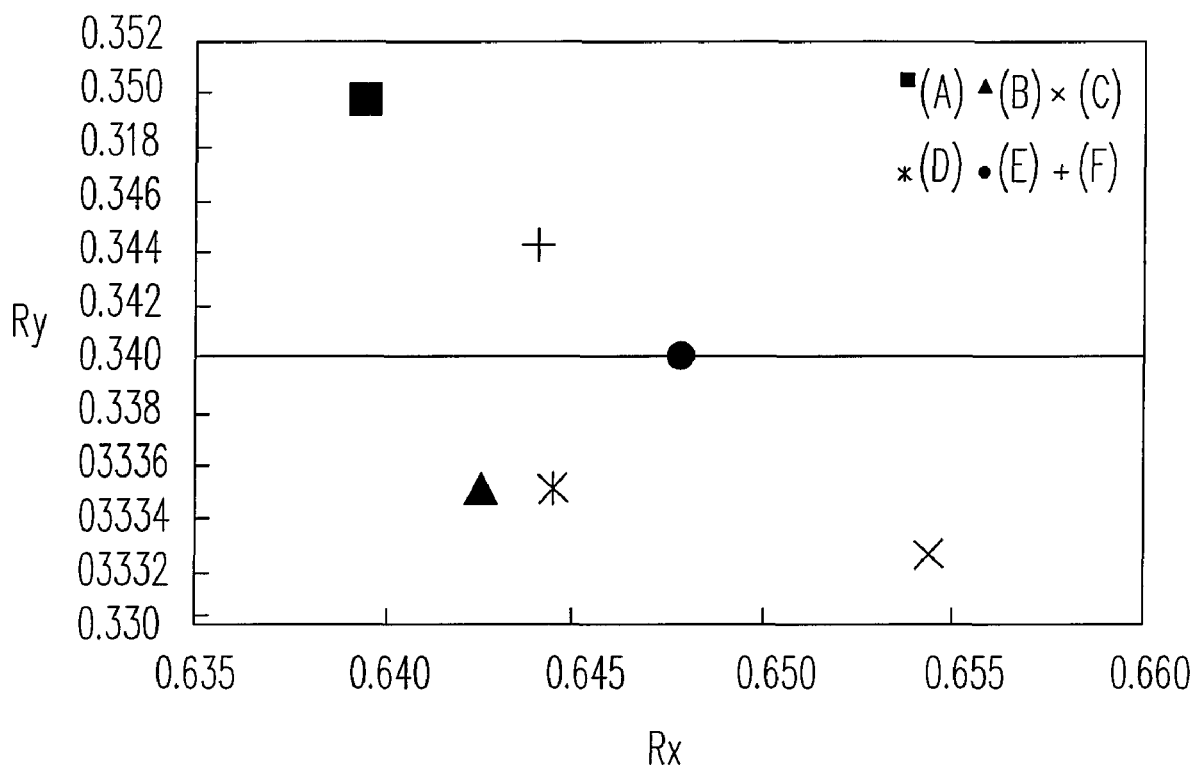
FIG. 6 is a diagram showing six different coordinate points of Table 2.

Referring to FIG. 6 and Table 2, when $A/B \geq 1.76$, the corresponding chroma coordinate $Ry \leq 0.340$ and the color-shift of the displayed red images by the conventional LCD can be improved, as shown by, for example, (B), (C), (D) and (E) in Table 2. In contrast, when the values are $A/B < 1.76$, the corresponding chroma coordinate $Ry > 0.340$, then, the displayed red images by the conventional LCD has color-shift, which are shown by, for example, III, IV, VIII and IX in the Table 1. The values listed in Table 2 are intended for describing, but do not limit, the present invention.

TABLE 2

|  | Rx — | Ry Ry ≤ 0.340 | B | A | A/B |
|---|---|---|---|---|---|
| (A) | 0.639 | 0.350 | 0.106 | 0.180 | 1.71 |
| (B) | 0.643 | 0.335 | 0.089 | 0.162 | 1.82 |
| (C) | 0.654 | 0.333 | 0.133 | 0.269 | 2.02 |
| (D) | 0.644 | 0.335 | 0.143 | 0.263 | 1.83 |
| (E) | 0.648 | 0.340 | 0.104 | 0.183 | 1.77 |
| (F) | 0.644 | 0.344 | 0.129 | 0.226 | 1.76 |

Note that in the above-mentioned embodiments, the backlight module can be a direct-type backlight module or an edge-type backlight module; the white light source can be a white LED or an organic LED. In addition, the above-mentioned two substrates include a TFT (thin film transistor) array substrate and a color filter substrate; the above-mentioned substrates include a COA (color filter on array) substrate and an alignment substrate with a common electrode; the above-mentioned two substrates include an AOC (array on color filter) substrate and an alignment substrate with a common electrode.

In summary, the LCD of the present invention has at least following advantages. First, by adjusting the frequency spectrums of the green color filter layer and the backlight module in addition to meeting the specific relationship equation, the color-shift phenomenon for a conventional LCD to display green images can be improved. Second, by adjusting the frequency spectrums of each color filter layer and the backlight module in addition to meeting the specific relationship equation, the color-shift phenomenon for a conventional LCD to display green images can be improved. Third, by adjusting the frequency spectrums of the red color filter layer and the backlight module in addition to meeting the specific relationship equation, the color-shift phenomenon for a conventional LCD to display red images can be improved. Finally, since the present invention is able to improve the color-shift occurred in an LCD during displaying color images, therefore, the LCD of the present invention has good color reproducibility and good color saturation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display, comprising:
   a backlight module having at least a white light source, wherein a normalized optical spectrum of the backlight module is $BL(\lambda)$, and
   a liquid crystal display panel disposed over the backlight module and comprising two substrates and a liquid crystal layer located between the substrates, wherein one of the substrates has a red color filter layer, a green color filter layer and a blue color filter layer, and the green color filter layer and the backlight module are subject to the following relationship:

$E = C/D$, and $E \geq 0.8$, wherein A is defined as the wavelength corresponding to the maximum peak value of $CF_{Green}(\lambda) \times BL(\lambda) \times x(\lambda)$; B is defined as the wavelength corresponding to the maximum peak value of $CF_{Green}(\lambda) \times BL(\lambda) \times y(\lambda)$; C is defined as the integral on $CF_{Green}(\lambda) \times BL(\lambda) \times x(\lambda)$ over the interval between A and B; D is defined as the integral on $CF_{Green}(\lambda) \times BL(\lambda) \times y(\lambda)$ over the interval larger than B; $CF_{Green}(\lambda)$ is the transmission spectrum of the green color filter layer, and $x(\lambda)$ and $y(\lambda)$ are color matching functions.

2. The liquid crystal display according to claim 1, wherein the backlight module comprises a direct-type backlight module or an edge-type backlight module.

3. The liquid crystal display according to claim 1, wherein the white light source comprises a white light-emitting diode or a white organic light-emitting diode.

4. The liquid crystal display according to claim 1, wherein the substrates comprise a thin film transistor (TFT) array substrate and a color filter substrate.

5. The liquid crystal display according to claim 1, wherein the substrates comprise a color filter on array (COA) substrate and an alignment substrate with a common electrode.

6. The liquid crystal display according to claim 1, wherein the substrates comprise an array on color filter (AOC) substrate and an alignment substrate with a common electrode.

7. A liquid crystal display, comprising:
   a backlight module, having at least a white light source, wherein a normalized optical spectrum of the backlight module is $BL(\lambda)$, and a liquid crystal display panel disposed over the backlight module and comprising two substrates and a liquid crystal layer located between the two substrates, wherein one of the two substrates has a red color filter layer, a color filter layer and a blue color filter layer, and the color filter layer comprises at least one of a green color filter layer, a cyan color filter layer and a yellow color filter layer, and the color filter layer and the backlight module are subject to the following relationship:

$E'=C/D$ and $E'\geqq 0.8$, wherein A is defined as the wavelength corresponding to the maximum peak value of $CF_X(\lambda)\times BL(\lambda)\times x(\lambda)$; B is defined as the wavelength corresponding to the maximum peak value of $CF_X(\lambda)\times BL(\lambda)\times y(\lambda)$; C is defined as the integral on $CF_X(\lambda)\times BL(\lambda)\times x(\lambda)$ over the interval between A and B; D is defined as the integral on $CF_X(\lambda)\times BL(\lambda)\times y(\lambda)$ over the interval larger than B, $CF_X(\lambda)$ is the transmission spectrum of the green color filter layer, and $x(\lambda)$ and $y(\lambda)$ are color matching functions.

8. The liquid crystal display according to claim 7, wherein the areas proportion of the green color filter layer, the cyan color filter layer and the yellow color filter layer is a:b:c, and the effective transmission spectrum of the color filter layer is defined as:

$$CF_X(\lambda) = \frac{a\times CF_{Green}(\lambda)+b\times CF_{Cyan}(\lambda)+c\times CF_{Yellow}(\lambda)}{a+b+c}$$

wherein $CF_{Green}(\lambda)$ is the transmission spectrum of the green color filter layer; $CF_{Cyan}(\lambda)$ is the transmission spectrum of the cyan color filter layer; $CF_{Yellow}(\lambda)$ is the transmission spectrum of the yellow color filter layer; and a, b and c are greater than or equal to zero, but a, b and c are not simultaneously zero.

9. The liquid crystal display according to claim 7, wherein the backlight module comprises a direct-type backlight module or an edge-type backlight module.

10. The liquid crystal display according to claim 7, wherein the white light source comprises a white light-emitting diode or a white organic light-emitting diode.

11. The liquid crystal display according to claim 7, wherein the substrates comprise a thin film transistor (TFT) array substrate and a color filter substrate.

12. The liquid crystal display according to claim 7, wherein the substrates comprise a color filter on array (COA) substrate and an alignment substrate with a common electrode.

13. The liquid crystal display according to claim 7, wherein the substrates comprise an array on color filter (AOC) substrate and an alignment substrate with a common electrode.

14. A liquid crystal display, comprising:
a backlight module, having at least a white light source, wherein the normalized optical spectrum of the backlight module is $BL(\lambda)$, and
a liquid crystal display panel disposed over the backlight module and comprising two substrates and a liquid crystal layer located between the two substrates, wherein one of the two substrates has a red color filter layer, a green filter layer and a blue color filter layer, and the red color filter layer and the backlight module are subject to the following relationship:

$A/B\geqq 1.76$, wherein A is defined as the maximum light intensity value of $CR_{Red}(\lambda)\times BL(\lambda)\times x(\lambda)$ between two wavelengths of 525 nm and 625 nm; B is defined as the maximum light intensity value of $CF_{Red}(\lambda)\times BL(\lambda)\times y(\lambda)$ between two wavelengths of 525 nm and 625 nm; $CF_{Red}(\lambda)$ is the transmission spectrum of the red color filter layer; and $x(\lambda)$ and $y(\lambda)$ are color matching functions.

15. The liquid crystal display according to claim 14, wherein the backlight module comprises a direct-type backlight module or an edge-type backlight module.

16. The liquid crystal display according to claim 14, wherein the white light source comprises a white light-emitting diode or a white organic light-emitting diode.

17. The liquid crystal display according to claim 14, wherein the substrates comprise a thin film transistor (TFT) array substrate and a color filter substrate.

18. The liquid crystal display according to claim 14, wherein the substrates comprise a color filter on array (COA) substrate and an alignment substrate with a common electrode.

19. The liquid crystal display according to claim 14, wherein the substrates comprise an array on color filter (AOC) substrate and an alignment substrate with a common electrode.

* * * * *